Patented Aug. 23, 1932

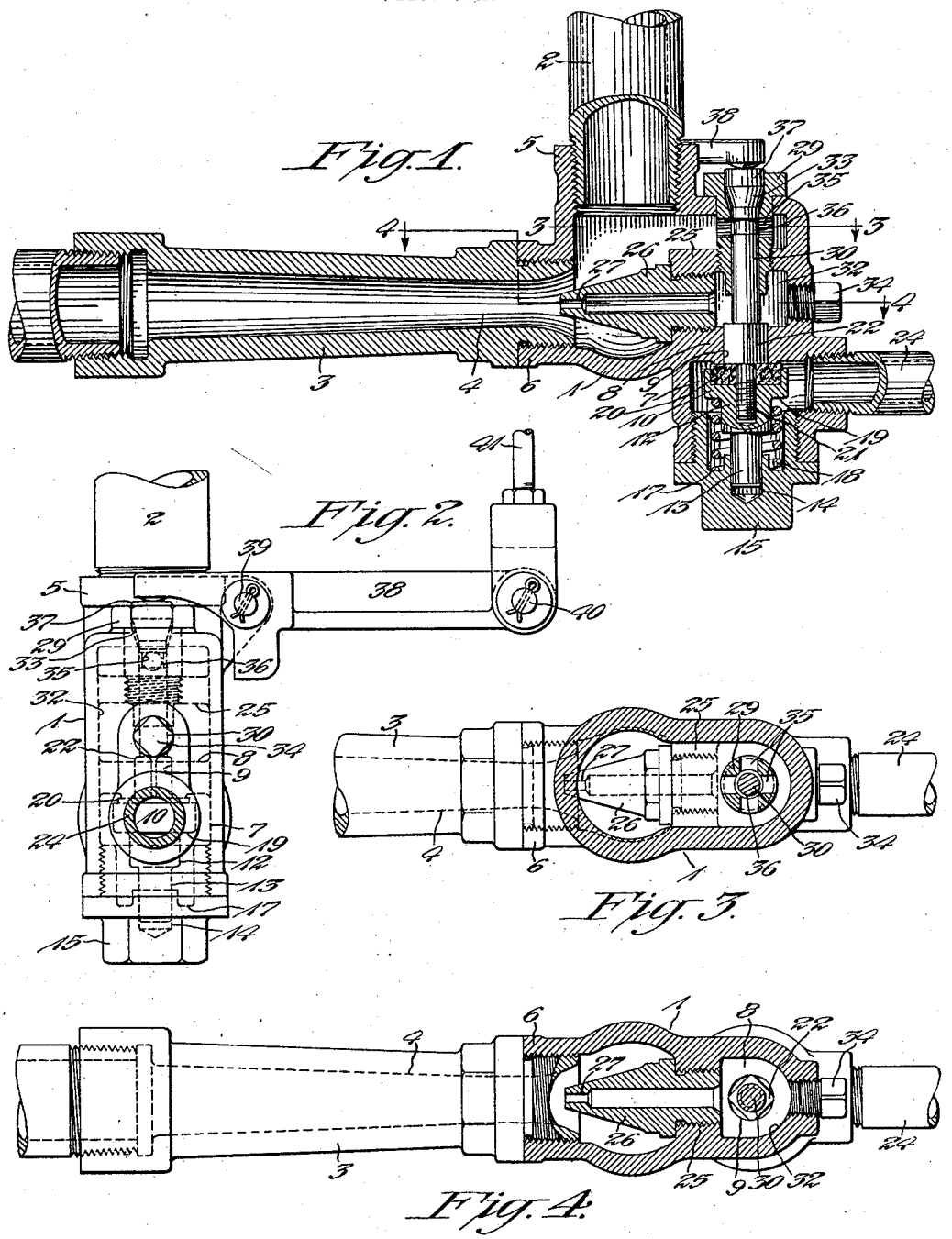

1,873,623

UNITED STATES PATENT OFFICE

CORNELIUS F. MORRISON, OF PAWTUCKET, RHODE ISLAND, ASSIGNOR OF ONE-HALF TO THOMAS F. VANCE, JR., OF PAWTUCKET, RHODE ISLAND

VALVE

Application filed June 19, 1930. Serial No. 462,372.

This invention relates to a leak-proof valve structure adapted for use with garment-pressing machines, injectors for boilers, and similar devices wherein steam or compressed air is employed as a means for moving entrained fluids.

One object of the invention is to provide a simple and compact valve structure capable of being actuated from a point without its casing and designed to eliminate the necessity for packing around the valve-actuating element to prevent the escape of high-pressure fluids.

Another object of the invention is the provision of a valve and valve-operating means within a casing having the parts so constituted and arranged as to admit high-pressure fluid to certain portions of the casing and at the same time develop a low pressure area at a desired point within the casing to thereby prevent the escape of the fluid around the actuating-element.

A further object of the invention is to provide a valve-casing having an interior Venturi throat or tube, and a valve for admitting fluid under pressure to the Venturi tube in such manner that the area of reduced pressure developed thereby will extend to a point within the casing where it acts to prevent the escape of fluid around the valve-stem.

Another object of the invention is the provision of a valve having an axially-movable valve-stem and a bearing for said valve-stem provided with an opening therein located intermediate the ends of the stem for effecting relief of pressure about the stem, with means for reducing the pressure in the area adjacent to the opening to prevent the escape of the fluid around the stem.

A further object of the invention is the provision of an injector or exhauster device having an improved valve-operating mechanism for controlling the admission of high-pressure fluid to the injector.

Other objects and advantages of the improvement are set forth in the following specification which describes a preferred form of construction of the invention, by way of example, as illustrated by the accompanying drawing. In the drawing:

Fig. 1 is an axial sectional view of the improved valve structure showing it connected to a steam-exhaust pipe for use with the bucks of garment-pressing machines and illustrating the Venturi tube and valve-operating mechanism;

Fig. 2 is an end elevation of the valve structure, illustrating the arrangement of the valve-stem operating means;

Fig. 3 is a top plan view, partially in horizontal section on line 3—3 of Fig. 1; and Fig. 4 is a top plan view, partially in horizontal section on line 4—4 of Fig. 1.

In the embodiment of the invention as herein illustrated the valve structure is shown as adapted for use with a garment-pressing machine of the type wherein steam is alternately supplied to and exhausted from the bucks in steaming, pressing and drying the garments; it being understood that the invention is not limited to use in devices of the particular character specified, but is capable of application to injectors or exhausters generally in which steam, compressed air or other fluid under pressure is employed for forcing an entrained fluid into or exhausting the same from a chamber.

In the form of the invention as illustrated in the present drawing the reference character 1 designates generally the casing of the valve, to which is connected a pipe 2 communicating with the interior of the buck of a garment-pressing machine, not shown, and an exhaust pipe 3 provided with a restricted Venturi throat 4. The connecting pipe 2 may be screwed into a boss 5 formed as a part of the casing 1, and one end of the exhaust pipe 3 may be similarly held in a boss 6 formed integral with the casing. The casing 1 is provided with a valve-chamber 7 separated from its main portion by a partition wall 8 having a port or opening 9 adapted to be closed by the valve 10 when the latter is seated.

The valve 10 comprises a main body portion 12 provided with a reduced end or spindle 13 slidably mounted within a counterbore 14 formed in a cap or end-closure 15. The end-closure 15 may be screwed into an opening in the casing 1 at the bottom of the valve-chamber 7, being provided with an annular recess 17 for the reception of a coiled spring 18. The opposite end of the spring 18 abuts an annular shoulder 19 on the valve 10 to normally hold the latter in engagement with its seat. The seat-engaging face of the valve 10 may comprise a washer 20 constructed of hard rubber, fibre or other suitable material for securing an effective seal. A stud 21 provided with an enlarged rectangular head 22 projects through an axial hole in the washer 20 and is threaded into the body portion 12 of the valve 10 to secure the washer in place thereon. The square or rectangular head 22 of the stud 21 is received in the circular opening or port 9 in the upper wall of the chamber 7 to serve in conjunction with the reduced spindle 13 to guide the valve and insure proper seating of its washer 20 against the rim of the port. The rectangular shape of the head 22 permits passage of the fluid through the port 9 when the washer 20 is moved out of engagement with its seat upon the wall 8.

A fluid pressure supply-pipe 24 is screwed into the end of the casing 1 to communicate with the valve-chamber 7, being employed to supply steam or compressed air to the Venturi throat 4 to create a partial vacuum in the casing to exhaust the steam from the buck or other chamber connected to the pipe 2; this being the usual method of operation employed in devices of the present type.

The interior of the valve casing 1 is formed with a second partition wall 25 forming an upper chamber 32, through the side of which is screwed a nozzle 26 provided with a central passage 27 of relatively small diameter for supplying steam under pressure to the restricted Venturi throat 4 of the exhaust pipe 3. A valve-stem bearing-sleeve 29 is inserted through the top of the casing 1 and secured in place in any suitable manner, for example, with its lower end screwed into an opening in the partition wall 25. Slidably mounted in the bore of the bearing-sleeve 29 is a valve-stem 30 having its lower end resting against the top of the head 22 of the valve 10. This arrangement provides that by sliding the valve-stem 30 downwardly it will act against the head 22 to move the valve 10 against the pressure of its spring 18 to release the washer 20 from its seat, whereby to admit pressure through the port 9 into the upper chamber 32.

The provision of the partition wall 25 together with the restricted nozzle 26 serves to form what is in effect a high-pressure chamber 32 when the valve 10 is open, the chamber 32 being then in direct communication with the lower valve-chamber 7 through the port 9. The high-pressure chamber 32 communicates with the Venturi throat 4 of the exhaust pipe 3 through the restricted opening 27 in the nozzle 26. A screw-threaded opening may be provided in the end of the casing 1 communicating with the high-pressure chamber 32, and so arranged as to permit of ready access to the passage 27 in the nozzle 26 for cleaning it, a suitable closure 34 in the form of a screw-plug being provided therefor.

The valve-stem bearing-sleeve 29 is provided with one or more radial openings or ducts 35, see Fig. 3, located above the partition wall 25 of the high-pressure chamber 32 and communicating with the bore of the bearing-sleeve. The valve-stem 30 may be provided with an annular groove 36 oppositely positioned relative to said openings or ducts 35. The valve-stem 30 may also be provided with an enlarged head 37 having a frusto-conical portion 33 adapted to seat in a correspondingly-shaped counterbore at the upper end of the bore in the bearing-sleeve 29 when the valve is opened. The frusto-conical faces of the stem and bore provide a wedging engagement tending to resist leakage around the stem at this point.

A valve-stem actuating arm or lever 38 is pivotally mounted at 39 on the side of the casing 7, being connected at 40 with a link 41 for operation from a suitable hand-lever or foot-pedal, not shown, whereby the valve-stem 30 is moved axially to actuate the valve 10 whenever it may be desired to admit high-pressure fluid into the chamber 32.

The method of operation of the device is as next explained: When it is desired to exhaust the steam from one or more of the bucks of the garment-pressing machine the lever 38 is moved about its pivot 39 to force the valve-stem 30 downwardly to thereby open the valve 10. Steam or other fluid, such as compressed air, is thus admitted under pressure to the chamber 32 to be injected through the passage 27 in the nozzle 26 into the restricted throat 4 of the exhaust pipe 3. The discharge of high-pressure steam or air through the Venturi throat creates a suction and thus forms a partial vacuum or area of low pressure within the main chamber of the casing 1. Consequently, suction is induced through the pipe 2 to exhaust the used steam from the interior of the bucks or other chambers with which the pipe connects.

The steam in the chamber 32, being under considerable pressure, would ordinarily tend to escape or leak out around the valve-stem 30, and with the usual construction of devices of this character the valve-stem is provided with a packing-gland or the like which has the disadvantage of resisting free movement of the valve-stem in its bearing. The provision of the annular groove 36 upon the valve-stem 30 and the openings or ducts 35 in the bearing 29 tends to relieve the pressure around the valve-stem at a point adjacent the low-pressure area caused by the suction of the jet of steam escaping through the Venturi throat 4. Therefore, any slight amount of steam, or in other cases air, escaping through the lower bearing for the valve-stem 30 is diverted through the ducts 35 and drawn into the stream of used steam being exhausted through the pipe 2. By thus providing an area of low pressure at a point within the casing surrounding the opening in which the valve-stem slides the steam is prevented from escaping or, in other words, leakage of pressure is avoided. Through this improved construction of the valve the use of packing-glands or similar means is avoided and the action of the valve rendered more free to provide for its easy operation.

If necessary or desirable, a layer of packing material may be positioned between the enlarged head of the valve-stem bearing-sleeve 29 and the casing 1 to prevent leakage of steam from the casing about the valve-stem bearing, but in the present embodiment of the invention the pressure at this point is sufficiently reduced to render such packing unnecessary if the parts are closely fitted with the head of the bearing-sleeve set down into snug engagement with the casing.

When the steam in the interior of the bucks has been exhausted to the desired extent through the pipe 2, release of pressure upon the valve-stem 30 by the lever 38 will enable the spring 18 to lift the valve 10 to thus seat the washer 20 to close the port 9. There being no packing around the valve-stem 30 its sliding action under the force of the spring 18 is not resisted and hence the valve cannot stick or jam in open position. The steam or other fluid in the supply-pipe 24 and valve-chamber 7 being under relatively high pressure a slight movement of the valve 10 is adequate to furnish sufficient steam to the chamber 32 for the production of the necessary suction effect through the Venturi throat 4 to perform the functions as above explained.

While I have herein shown and described one form of construction of the invention it is to be understood that various modifications may be made in the size, proportions and arrangement of the parts of the device without departing from the spirit and scope of the claims appended hereto, which are to be broadly construed in the light of the disclosure.

I claim:

1. In a device of the type specified, a casing having intake and exhaust openings, a Venturi tube communicating with the exhaust opening, an injector-nozzle communicating with the interior of the Venturi tube, a port leading from the intake to the nozzle, a valve for closing said port, and a valve-stem projecting through the outer wall of the casing and arranged to operate the valve, said valve-stem projecting through the casing at a point where a low pressure area is produced by the suction of the fluid injected from the nozzle through the Venturi tube.

2. In a device of the type specified, a casing having a partition wall dividing its interior into separate high-pressure and low-pressure chambers and provided with intake and exhaust openings, a Venturi tube communicating with the exhaust opening, an injector-nozzle directed into the Venturi tube, a port leading from the high-pressure chamber to the nozzle, a valve for closing said port, and a valve-stem for operating the valve, said valve-stem projecting through an opening in the outer wall of the casing at a point within the low-pressure chamber whereby the suction produced therein by the action of the Venturi tube will prevent the escape of pressure around the valve-stem.

3. In a device of the type specified, a casing having a division wall separating its interior into high-pressure and low-pressure chambers and provided with an exhaust opening leading from the low-pressure chamber and an inlet leading into the high-pressure chamber, a Venturi tube communicating with the exhaust opening, a nozzle communicating with the high-pressure chamber and directed into the Venturi tube, a port opening between the inlet and the nozzle, a valve for closing said port, a valve-stem for operating the valve, a bearing for the valve-stem in the division wall, and a second bearing for the valve-stem in the outer wall of the casing through which the valve-stem projects, said last-mentioned bearing being located in the low-pressure chamber whereby the suction produced therein by the action of the Venturi tube will prevent the escape of pressure around the valve stem.

In testimony whereof I hereunto affix my signature.

CORNELIUS F. MORRISON.